(12) United States Patent
Imura et al.

(10) Patent No.: US 12,272,849 B2
(45) Date of Patent: Apr. 8, 2025

(54) MEMBRANE ELECTRODE ASSEMBLY FOR FUEL CELL, AND FUEL CELL

(71) Applicant: Panasonic Intellectual Property Management Co., Ltd., Osaka (JP)

(72) Inventors: Shinichiro Imura, Hyogo Ken (JP); Takeshi Minamiura, Osaka Fu (JP); Kenichi Ezaki, Osaka Fu (JP); Tsutomu Kawashima, Nara Ken (JP); Miyuki Yoshimoto, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 383 days.

(21) Appl. No.: 17/849,346

(22) Filed: Jun. 24, 2022

(65) Prior Publication Data

US 2022/0359899 A1  Nov. 10, 2022

Related U.S. Application Data

(63) Continuation of application No. PCT/JP2020/045712, filed on Dec. 8, 2020.

(30) Foreign Application Priority Data

Dec. 26, 2019  (JP) .................................. 2019-236908

(51) Int. Cl.
*H01M 8/1004* (2016.01)
*H01M 4/88* (2006.01)
*H01M 4/96* (2006.01)

(52) U.S. Cl.
CPC ....... *H01M 8/1004* (2013.01); *H01M 4/8807* (2013.01); *H01M 4/96* (2013.01)

(58) Field of Classification Search
CPC ....... H01M 2008/1095; H01M 4/8605; H01M 4/8807; H01M 4/96; H01M 8/0234;
(Continued)

(56) References Cited

U.S. PATENT DOCUMENTS 8,202,570 B2 * 6/2012 Tanuma ............. H01M 8/1004
427/115
2009/0239117 A1   9/2009 Yamagata
(Continued)

FOREIGN PATENT DOCUMENTS

| JP | 2009-259782 A | 11/2009 |
| JP | 2019-153416 A | 9/2019 |
| WO | 2010/050219 A | 5/2010 |

OTHER PUBLICATIONS

International Search Report dated Feb. 9, 2021, issued in International Patent Application No. PCT/JP2020/045712, with English translation.

*Primary Examiner* — Victoria H Lynch
(74) *Attorney, Agent, or Firm* — Rimon P.C.

(57) ABSTRACT

A membrane electrode assembly for a fuel cell includes a catalyst layer having a first main surface and a second main surface, a gas diffusion layer disposed on a side of the first main surface, and an electrolyte membrane disposed on a side of the second main surface, wherein the gas diffusion layer includes a conductive material and a polymer resin, the conductive material comprises a fibrous carbon material, an average fiber diameter D of the fibrous carbon material is equal to or less than 25% of a thickness T of the catalyst layer, and in a cross section in a thickness direction of the catalyst layer, an arithmetic mean roughness Ra1 of the first main surface and an arithmetic mean roughness Ra2 of the second main surface satisfies the relation, Ra1>Ra2.

14 Claims, 5 Drawing Sheets

(58) Field of Classification Search
CPC ............. H01M 8/0239; H01M 8/0243; H01M 8/1004; Y02E 60/50
See application file for complete search history.

(56) References Cited

U.S. PATENT DOCUMENTS

2011/0076592 A1     3/2011   Yamauchi et al.
2019/0273267 A1     9/2019   Saito

* cited by examiner

[FIG. 1]
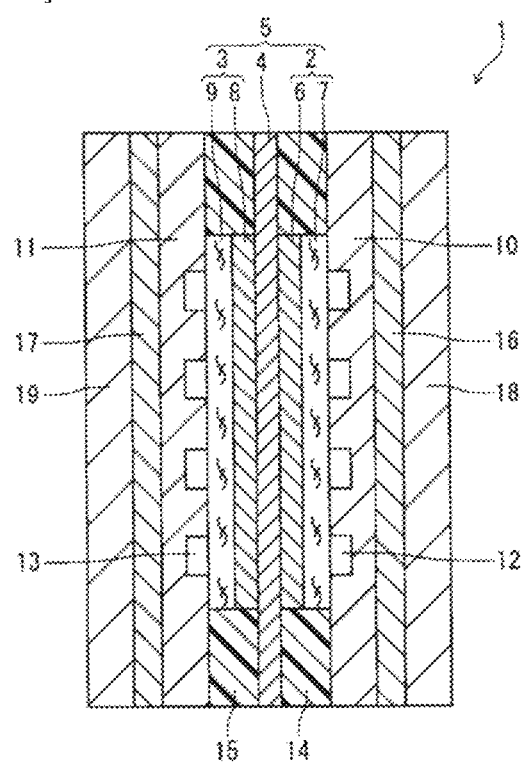

[FIG. 2]
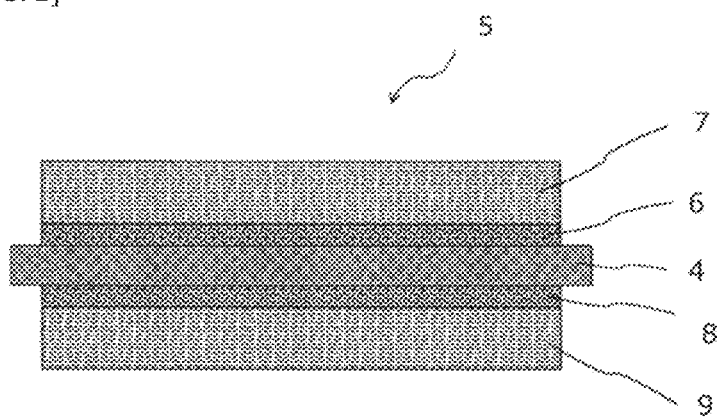

[FIG. 3]
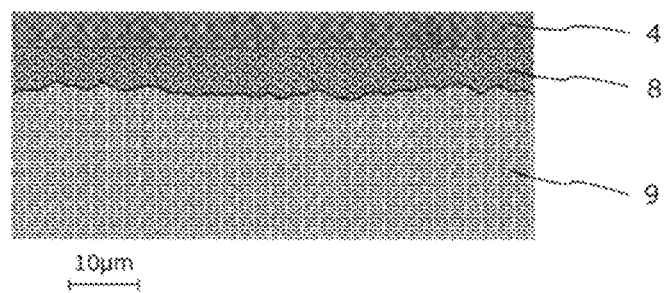

[FIG. 4]
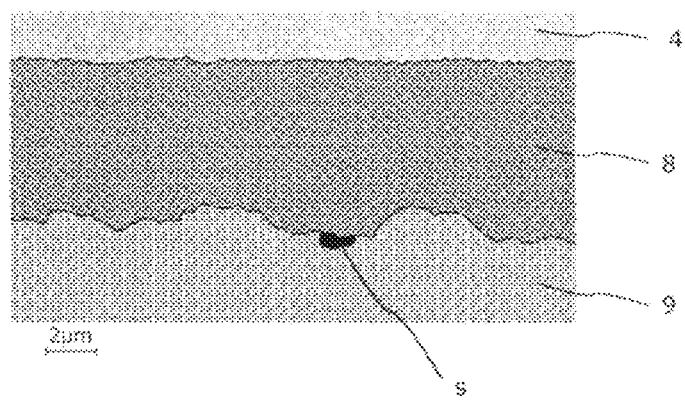

[FIG. 5]
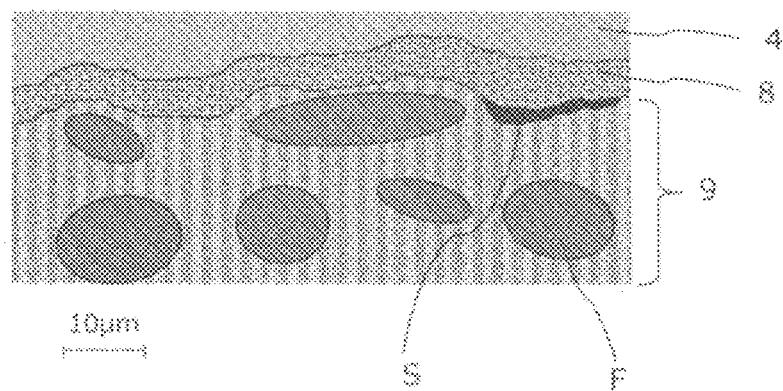

MEMBRANE ELECTRODE ASSEMBLY FOR FUEL CELL, AND FUEL CELL

CROSS-REFERENCE OF RELATED APPLICATIONS

This application is the Continuation of International Patent Application No. PCT/JP2020/045712, filed on Dec. 8, 2020, which in turn claims the benefit of Japanese Patent Application No. 2019-236908, filed on Dec. 26, 2019, the entire disclosures of which Applications are incorporated by reference herein.

TECHNICAL FIELD

The present invention relates primarily to a membrane electrode assembly for a fuel cell and a fuel cell.

BACKGROUND ART

Fuel cells are a highly efficient and clean power generator that generates power by an electrochemical reaction between a fuel and an oxidant (each of which simply referred to as a gas), and produce water. A fuel cell includes, for example, an electrolyte membrane, two catalyst layers disposed to sandwich the electrolyte membrane, two gas diffusion layers disposed to sandwich the electrolyte membrane with the catalyst layers, and two separators disposed to sandwich the electrolyte membrane with the gas diffusion layers. Gases diffused in the plane direction by the gas diffusion layer are oxidized or reduced in the catalyst layer. Increasing the gas diffusivity in the catalyst layer improves the efficiency of this electrochemical reaction.

Patent Literature 1 proposes a gas diffusion layer disposed in contact with a separator having a channel-like fluid flow path, and having a diffusion layer substrate with a ratio of pore diameter to thickness of 0.35 or more, wherein when the diffusion layer substrate has a conductive carbon fiber, the content of the conductive carbon fiber is 30% or more. In Patent Literature 1, the diffusion layer substrate is formed into a sheet shape by, for example, conductive carbon fiber and thermoplastic resin. Examples of the conductive carbon fiber include carbon fiber, carbon paper, carbon cloth, and the like.

CITATION LIST

Patent Literature

PLT1: Japanese Laid-Open Patent Publication No. 2019-153416

SUMMARY OF INVENTION

Solution to Problem

However, if the gas diffusion layer contains conductive carbon fibers, depending on the thickness of the fibers and the thickness of the catalyst layer, the catalyst layer surfaces in contact with the electrolyte membrane may have large unevenness, damage the electrolyte membrane, and a large gap may form between the gas diffusion layer and the catalyst layer.

For example, when the gas diffusion layer has a diffusion layer substrate that contains conductive carbon fibers as in Patent Literature 1, a large unevenness is formed by the conductive carbon fibers. As a result, unevenness is also formed in the catalyst layer along the unevenness of the gas diffusion layer, and the electrolyte membrane may be greatly deformed. When the electrolyte membrane is deformed, deterioration of the electrolyte membrane is accelerated from the deformed portion as a starting point. On the other hand, if the catalyst layer does not follow the unevenness of the gas diffusion layer, a large gap is formed between the gas diffusion layer and the catalyst layer, resulting in increased resistance and retention of generating water.

Means for Solving the Problem

One aspect of the present invention relates to a membrane electrode assembly for a fuel cell (first membrane electrode assembly for a fuel cell) including a catalyst layer having a first main surface and a second main surface; a gas diffusion layer disposed on a side of the first main surface, and an electrolyte membrane disposed on a side of the second main surface, wherein the gas diffusion layer includes a conductive material and a polymer resin, and the conductive material includes a fibrous carbon material, an average fiber diameter D of the fibrous carbon material is equal to or less than 25% of a thickness T of the catalyst layer, and in a cross section in a thickness direction of the catalyst layer, the arithmetic mean roughness $Ra_1$ of the first main surface and the arithmetic mean roughness $Ra_2$ of the second main surface satisfies the relation, $Ra_1 > Ra_2$.

Another aspect of the present invention relates to a membrane electrode assembly for a fuel cell (second membrane electrode assembly for a fuel cell) including an electrolyte membrane, a pair of catalyst layers disposed to sandwich the electrolyte membrane, and a pair of gas diffusion layers disposed to sandwich the electrolyte membrane with the pair of catalyst layers interposed therebetween, wherein the pair of catalyst layers each has a first main surface and a second main surface, the gas diffusion layer is disposed on a side of the first main surface, the electrolyte membrane is disposed on a side of the second main surface, at least one of the pair of gas diffusion layers includes a conductive material and a polymer resin, the conductive material includes a fibrous carbon material, an average fiber diameter D of the fibrous carbon material is equal to or less than 25% of a thickness T of the catalyst layer, and in a cross section in a thickness direction of the catalyst layer, an arithmetic mean roughness $Ra_1$ of the first main surface and an arithmetic mean roughness $Ra_2$ of the second main surface satisfies the relation, $Ra_1 > Ra_2$.

Still another aspect of the present invention relates to a fuel cell including the second membrane electrode assembly for a fuel cell and a pair of separators disposed to sandwich the membrane electrode assembly for a fuel cell with the pair of gas diffusion layers provided by the second membrane electrode assembly for a fuel cell.

Effects of Invention

According to the membrane electrode assembly for a fuel cell of the present invention, the damage caused by the deformation of the electrolyte membrane and the gap that can be formed between the gas diffusion layer and the catalyst layer can be reduced.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 1 A schematic cross-sectional view showing a structure of a unit cell of a fuel cell according to the present invention.

FIG. 2 A schematic cross-sectional view showing a structure of a membrane electrode assembly according to the present invention.

FIG. 3 An illustration of a cathode-side area of an SEM image of a cross section of a membrane electrode assembly for a fuel cell of Example 1.

FIG. 4 An enlarged view of a part in FIG. 3.

FIG. 5 An illustration of a cathode-side area in an SEM image of a cross section of a membrane electrode assembly for a fuel cell of Comparative Example 1.

DESCRIPTION OF EMBODIMENTS

A membrane electrode assembly for a fuel cell of a first embodiment of the present invention includes a catalyst layer including a first main surface and a second main surface; a gas diffusion layer disposed on a side of the first main surface; and an electrolyte membrane disposed on a side of the second main surface. The gas diffusion layer includes a conductive material (hereinafter, also referred to as a first conductive material) and a polymer resin (hereinafter, also referred to as a first polymer resin), the first conductive material includes a first fibrous carbon material, and an average fiber diameter D of the first fibrous carbon material is equal to or less than 25% of a thickness T of the catalyst layer. The combination of the catalyst layer and the gas diffusion layer may constitute an anode or a cathode.

The membrane electrode assembly for a fuel cell according to a second embodiment of the present invention includes an electrolyte membrane, a pair of catalyst layers disposed so as to sandwich the electrolyte membrane, and a pair of gas diffusion layers disposed to sandwich the electrolyte membrane with the pair of catalyst layers interposed therebetween. The pair of catalyst layers each has a first main surface and a second main surface, and the gas diffusion layer is disposed on a side of the first main surface and the electrolyte membrane is disposed on a side of the second main surface.

In the second embodiment, at least one of the pair of catalyst layers corresponds to a combination of the catalyst layer and the gas diffusion layer according to the first embodiment. That is, at least one of the pair of gas diffusion layers includes a first conductive material and a first polymer resin, and the first conductive material includes a first fibrous carbon material, and the average fiber diameter D of the first fibrous carbon material is equal to or less than 25% of the thickness T of the catalyst layer.

In the second embodiment, one of the combinations of the pair of catalyst layers and the gas diffusion layers constitutes one of the anode and the cathode, and the other of the combinations of the pair of catalyst layers and the gas diffusion layers constitutes the other of the anode and the cathode.

A fuel cell according to still another embodiment of the present invention includes a membrane electrode assembly for a fuel cell according to the second embodiment and a pair of separators disposed to sandwich the membrane electrode assembly for a fuel cell with the pair of gas diffusion layers provided by the membrane electrode assembly for a fuel cell of the second embodiment.

In other words, at least one of the gas diffusion layers includes a first conductive material and a first polymer resin, the first conductive material includes a first fibrous carbon material, and the average fiber diameter D of the first fibrous carbon material may be equal to or less than 25% of the thickness T of the catalyst layer. Also, both of the gas diffusion layers may each contain an independent first conductive material and an independent first polymer resin, each of the first conductive material may contain a first fibrous carbon material, and each of the first fibrous carbon material may have an average fiber diameter D of equal to or less than 25% of the thickness T of the corresponding catalyst layer.

When the gas diffusion layer includes the first conductive material and the first polymer resin, and the first conductive material includes the first fibrous carbon material, the mechanical strength of the gas diffusion layer is improved, the gas diffusivity of the gas diffusion layer is easily designed, the gas is diffused more smoothly, and the pressure loss is suppressed. In addition, by properly controlling the gas diffusivity, the humidity of the electrolyte membrane can be properly maintained easily.

When the average fiber diameter D of the first fibrous carbon material is equal to or less than 25% of the thickness T of the catalyst layer (i.e., when the first fibrous carbon is thin enough relative to the thickness T of the catalyst layer), the unevenness on the first main surface side of the gas diffusion layer will be small enough relative to the thickness of the catalyst layer, and the unevenness will have less effect on the electrolyte membrane. Further, by using a gas diffusion layer containing a first fibrous carbon sufficiently thin with respect to the thickness T of the catalyst layer and a first polymer resin, the stretchability or flexibility of the first polymer resin is sufficiently exhibited, and the gas diffusion layer can be flexibly deformed plastically in accordance with the shape of the unevenness of the first fibrous carbon. This further reduces the impact of the gas diffusion layer on the electrolyte membrane. These effects greatly reduce the deformation of the electrolyte membrane. Consequently, local current concentration in the electrolyte membrane is suppressed, and the durability of the electrolyte membrane (and even catalyst layer) is further improved. Furthermore, by reducing the unevenness in the gas diffusion layer on the first main surface side to be sufficiently small relative to the catalyst layer thickness, and by allowing the gas diffusion layer to be flexibly and plastically deformed in accordance with the shape of the unevenness of the catalyst layer, the gas diffusion layer and the catalyst layer are easily brought into contact closely, and a gap that can be formed between the gas diffusion layer and the catalyst layer becomes small. As a result, the interface separation between catalyst layer and gas diffusion layer is easily suppressed, and the gas diffusivity to the catalyst layer is further improved, thereby reducing the resistivity.

In a cross section in a thickness direction of the catalyst layer, the arithmetic mean roughness Ra1 of the first main surface and the arithmetic mean roughness Ra2 of the second main surface satisfies the relation Ra1>Ra2. Even when the unevenness of the first main surface of the gas diffusion layer is relatively and sufficiently small relative to the thickness of the catalyst layer and the gas diffusion layer can flexibly and plastically be deformed in accordance with the shape of the unevenness of the catalyst layer, it may be difficult to sufficiently suppress the deformation of the electrolyte membrane and sufficiently reduce damage due to the deformation of the electrolyte membrane, when the relation Ra1>Ra2 is not satisfied (if Ra1≤Ra2). When Ra1≤Ra2, the transfer of gases from the first main surface to the second main surface tends to be stagnated and the transfer of water produced by the catalyst layer to the gas diffusion layer tends to be stagnated. To satisfy Ra1>Ra2, for example, as will be described later, it is effective to form a catalyst layer once on a transfer substrate sheet having a flat surface.

More preferably, the ratio of the arithmetic mean roughness Ra1 of the first main surface to the arithmetic mean roughness Ra2 of the second main surface: Ra1/Ra2 may satisfy 2≤Ra1/Ra2. When such a relation is satisfied, the damage due to the deformation of the electrolyte membrane is greatly reduced, and the resistivity between the gas diffusion layer and the catalyst layer is easily suppressed. However, Ra1 and Ra2 are interrelated. The unevenness at the interface between the gas diffusion layer and the catalyst layer should preferably be made small considerably in view of reducing Ra2 and reducing the deformation of the electrolyte membrane. The smaller the unevenness at the interface between the gas diffusion layer and the catalyst layer is, the more advantageous it is to form a smaller gap that can be formed between the gas diffusion layer and the catalyst layer. In view of these, desirably Ra1 is relatively low, for example, Ra1/Ra2<10 or Ra1/Ra2<5 is satisfied.

The thickness T of the catalyst layer is desirably formed to be as thin as possible in view of reducing the use of expensive catalysts and reducing the resistivity. On the other hand, in view of strength, preferably, the thickness T of the catalyst layer should not be excessively thin. The thickness T of the catalyst layer may be, for example, 1 μm or more, or may be 5 μm or more. The thickness T of the catalyst layer may be, for example, 20 μm or less, 10 μm or less, or 5 μm or less. The thickness T of the catalyst layer may be, for example, 1 μm or more and 20 μm or less, 1 μm or more and 10 μm or less, or 5 μm or more and 10 μm or less.

The thickness T of the catalyst layer is an average thickness, and is obtained by picking up any ten points in the cross section of the catalyst layer, drawing a straight line along the thickness direction of the catalyst layer from the first main surface to the second main surface, and averaging the obtained distances.

The arithmetic mean roughness Ra1 of the first main surface may be equal to or less than 30% of the thickness T of the catalyst layer. In this case, because the unevenness of the catalyst layer on the first main surface side is sufficiently small with respect to the thickness T of the catalyst layer, the gas diffusion layer and the catalyst layer are easily allowed to contact each other to a high degree while sufficiently securing the strength of the catalyst layer.

The arithmetic mean roughness Ra1 of the first main surface may be equal to or more than 10% of the thickness T of the catalyst layer. In this case, because the bonding strength between the gas diffusion layer and the catalyst layer is increased by allowing the gas diffusion layer to enter into the space formed by the unevenness of the catalyst layer, the peeling is easily suppressed between the gas diffusion layer and the catalyst layer.

The arithmetic mean roughness Ra2 of the second main surface may be equal to or less than 5% of the thickness T of the catalyst layer. In this case, because the deformation of the electrolyte membrane is extremely small, the effect of reducing the damage caused by the deformation of the electrolyte membrane is remarkable.

As mentioned above, desirably, the arithmetic mean roughness Ra1 of the first main surface is considerably small. The arithmetic mean roughness Ra1 of the first main surface may be, for example, 2 μm or less, or 1.5 μm or less in view of allowing the gas diffusion layer and the catalyst layer to contact closely while sufficiently securing the strength of the catalyst layer.

In addition, Ra1 may be 0.6 μm or more in view of enhancing the bonding strength between the catalyst layer and the gas diffusion layer by allowing the gas diffusion layer to enter into the space formed by the unevenness of the catalyst layer.

In addition, the arithmetic mean roughness Ra2 of the second main surface is desirably even smaller in view of remarkably suppressing deformation of the electrolyte membrane, and Ra2 may be, for example, 0.3 μm or less, or may be 0.2 μm or less.

The arithmetic mean roughness Ra1 of the first main surface and the arithmetic mean roughness Ra2 of the second main surface can be measured with the following method. First, a cross section along the stacking direction (thickness direction) of the stack of the catalyst layer and the gas diffusion layer is captured to obtain an SEM image. The magnification of the SEM image is set to 1000 to 5000 times. The magnification is, for example, when the size in one direction on the displayed screen is 10 cm and the scanning width in the one direction of the scanning probe of the SEM is 100 μm, the magnification is 1000 times. In the obtained SEM image, a cross-sectional curve of the first main surface and the second main surface of the catalyst layer is obtained conforming to JIS B 0601 (2001), converted to a roughness curve, and an arithmetic mean roughness Ra is obtained from the obtained roughness curve. The scanning width of the scanning probe of the SEM shall be 50 μm or more.

The average fiber diameter D may be equal to or less than 25% of the thickness T of the catalyst layer, but the average fiber diameter D is desirably sufficiently smaller than the arithmetic mean roughness Ra1 of the first main surface of the catalyst layer, and more desirably sufficiently smaller than the arithmetic mean roughness Ra2 of the second main surface of the catalyst layer, in that Ra1 is easily suppressed to be small. Specifically, the average fiber diameter D may be, for example, 250 nm or less, and may be 170 nm or less. This is preferable in view of also sufficiently securing a tine gas path. The lower limit of the average fiber diameter D is not particularly limited, but may be, for example, 5 nm or more in view of reducing the resistance by using the first fibrous carbon material as an electronic path. In other words, the average fiber diameter D may be 5 nm or more and 250 nm or less, or may be 5 nm or more and 170 nm or less.

The average fiber diameter D is obtained by arbitrarily taking out 10 first fibrous carbon materials from the gas diffusion layer and averaging diameters of them. The diameter is a length perpendicular to the length direction of the first fibrous carbon material.

The average length L of the first fibrous carbon material is not particularly limited. The average length L of the first fibrous carbon material may be, for example, 0.2 μm or more, and may be 0.5 μm or more. The average length L1 of the first fibrous carbon material may be, for example, 20 μm or less, and may be 10 μm or less. When the average length L is within this range, the mechanical strength of the gas diffusion layer is further improved, and the gas diffusivity of the gas diffusion layer is easily designed, which is advantageous for suppressing the pressure loss. The average length L is determined by taking 10 arbitrarily first fibrous carbon material from the gas diffusion layer and averaging actual lengths of them.

As described above, the smaller the gap that can be formed between the gas diffusion layer and the catalyst layer, the more desirable. However, the interface region between the catalyst layer and the gas diffusion layer necessarily has a gap. Such a gap provides a gas path from the gas diffusion layer to the catalyst layer. Specifically, the size Wk in a direction along the interface of the gap is desired to be equal to or less than the thickness T of the catalyst layer, and may be equal to or less than 0.8×T, or may be equal to or less than 0.4×T. When the Wk is equal to or less than T, even if such a gap is present, the path through which the electrons circulate is not increased, thereby suppressing the increase in resistivity. In addition, cracks and the like are less likely to occur in the catalyst layer, and the form of the catalyst layer is likely to be maintained. At this time, the size Ws of the gap in the thickness direction of the catalyst layer is desirably equal to or less than Wk, and may be equal to or less than 0.8×Wk. With the Ws of less than Wk, reduction of gas diffusivity and peeling of the gas diffusion layer are less likely to occur because the water produced (or back-diffused water) is easily discharged without stagnation at the interface between the gas diffusion layer and the catalyst layer. In addition, even if a part of the catalyst layer is damaged and falls into the gap, the function of the catalyst layer is easily maintained.

Hereinafter, the configuration of the gas diffusion layer will be described in detail.

(Gas Diffusion Layer)

Although a gas diffusion layer including a first conductive material and a first polymer resin will suffice, desirably, the gas diffusion layer is a "porous member containing a first conductive material and a first polymer resin as main components". Here, the term "porous member containing the first conductive material and the first polymer resin as main components" means a porous member having a structure (so-called self-support structure) which is supported by the first conductive material and the first polymer resin without having a woven fabric or a nonwoven fabric such as carbon paper or carbon cloth as a substrate. The gas diffusion layer only needs to have enough thickness (e.g., 30 μm or more) for areas that do not have such a substrate, and the embodiment of the present invention does not exclude a configuration in which the surface of gas diffusion layer that does not come into contact with the catalyst layer is composed of the substrate as described above.

When a porous member is manufactured by the first conductive material and the first polymer resin, for example, a surfactant and a dispersion medium are used as described later. In this case, during the manufacturing process, the surfactant and the dispersion medium are removed by firing, but they may not be sufficiently removed and they may remain in the porous member. Accordingly, the term "porous member containing the first conductive material and the first polymer resin as main components" means that the surfactant and the dispersion medium thus remained may be included in the porous member as long as the structure is supported by the first conductive material and the first polymer resin. Further, it is also meant that a material other than the first conductive material and the first polymer resin and the surfactant and the dispersion medium may be included in the porous member.

It is desirable that the first conductive material contains a first fibrous carbon material as a main component. For example, the mass ratio of the first fibrous carbon material in the gas diffusion layer may be 10 mass % or more and 90 mass % or less, and may be 20 mass % or more and 75 mass % or less. In terms of easily ensuring enough gas diffusivity, desirably, the mass ratio of the first fibrous carbon material is higher. On the other hand, by suitably controlling the mass ratio of the first fibrous carbon material, the resistance is easily reduced.

The thickness of the gas diffusion layer desirably is thin, considering the size reduction of the fuel cell. On the other hand, in view of strength, preferably, the gas diffusion layer should not be excessively thin. The thickness of the gas diffusion layer may be, for example, 30 μm or more and 1000 μm or less, preferably 50 μm or more and 500 μm or less, and may be 80 μm or more and 300 μm or less.

The thickness of the gas diffusion layer is an average thickness, and it is obtained by picking up any ten points in the cross section of the gas diffusion layer, drawing a straight line along the thickness direction of the gas diffusion layer from one main surface to the other main surface, and averaging the obtained distances.

<First Fibrous Carbon Material>

The first fibrous carbon material has an aspect ratio of 2 or more and is conductive. The aspect ratio of the first fibrous carbon material may be 3 or more, or may be 5 or more. Also, the aspect ratio of the first fibrous carbon material may be 1000 or less, may be 500 or less, or may be 100 or less. The aspect ratio of the first fibrous carbon material is, for example, 3 or more and 1000 or less. The aspect ratio of the first fibrous carbon material is the ratio of the average length L to average fiber diameter D of the first fibrous carbon material (L/D).

Examples of the first fibrous carbon material include vapor grown carbon fibers (VGCF®), single or multilayered carbon nanotubes (CNTs), and carbon nanofibers. The first fibrous carbon material may have a hollow space (hollow portion) inside. Both ends of the first fibrous carbon material in the length direction may be opened.

As the first fibrous carbon material, two or more of those having different materials, different average fiber diameters D and/or average lengths L may be mixed and used. For example, the first fibrous carbon material may include a single layered carbon nanotubes and a multilayered carbon nanotubes.

<First Polymer Resin>

The first polymer resin has a function as a binder for binding the first conductive material together. In view of suppressing the residence of water in the gas diffusion layer, preferably, 50 mass % or more, and even 90 mass % or more of the first resin material is a water-repellent resin. The polymer resin may further include a proton conductive resin (polymer electrolyte). The mass ratio of the first polymer resin in the gas diffusion layer may be 5 mass % or more and 50 mass % or less, or 10 mass % or more and 40 mass % or less.

Examples of the water-repellent resin include fluororesin. Examples of the fluororesin include PTFE (polytetrafluoroethylene), FEP (tetrafluoroethylene-hexafluoropropylene copolymer), PVdF (polyvinylidene fluoride), ETFE (tetrafluoroethylene-ethylene copolymer), PCTFE (polychlorotrifluoroethylene), and PFA (tetrafluoroethylene-perfluoroalkylvinylether copolymer). Among these, preferably, fluorocarbon resin is PTFE, in view of thermal resistance, water repellency, and chemical resistance.

The proton conductive resin is not particularly limited. Examples of the proton conductive resin include a perfluorocarbon sulfonic acid-based polymer and a hydrocarbon-based polymer. Among these, a perfluorocarbon sulfonic acid-based polymer or the like is preferable because it has excellent heat resistance and chemical stability. As the perfluorocarbon sulfonic acid-based polymer, for example, Nafion® can be used.

<Other>

The gas diffusion layer may include a particulate carbon material, a plate-shaped carbon material, or the like as a conductive material.

The particulate carbon material has an aspect ratio of less than 2 and is electrically conductive. The particulate carbon material is not particularly limited, and examples thereof include carbon black, spherical graphite, and activated carbon. Of these, carbon black is preferred in terms of high conductivity and large pore volume. Examples of carbon black include acetylene black, Ketjen black, thermal black, furnace black, channel black, and the like. The particle size (or the length of the structure composed of a plurality of primary particles connected) can be the one used usually in the gas diffusion layer of a fuel cell.

The average particle diameter of the primary particles of the particulate carbon material is preferably 250 nm or less, and may be 170 nm or less. The average particle diameter of the primary particles may be obtained as an average value of the maximum diameter of each particle when 100 primary particles of the particulate carbon material are observed with a microscope.

The mass ratio of the particle carbon material in the gas diffusion layer is not particularly limited, but in view of gas diffusivity, the mass ratio of the particulate carbon material in the gas diffusion layer may be 30 mass % or less, or may be 20 mass % or less.

Specific examples of the plate-like carbon material include scaly graphite, graphitized polyimide film pulverized product, graphene, and the like. Among them, the graphitized polyimide film pulverized product or graphene is easily oriented in the plane direction, is advantageous for forming the gas diffusion layer thinly, and is suitable for enhancing the gas diffusivity in the plane direction.

The thickness of the plate-like carbon material is preferably 250 nm or less, and may be 170 nm or less. The thickness of the plate-like carbon material may be calculated as the average value of the maximum thickness of 100 particles of the plate-like carbon material observed by microscopy.

The mass ratio of the plate-like carbon material in the gas diffusion layer is not particularly limited, but in view of gas diffusivity, the mass ratio of the plate-like carbon material in gas diffusion layer may be 30 mass % or less, or may be 20 mass % or less.

<Production Method of Gas Diffusion Layer>

The gas diffusion layer is obtained, for example, by forming a mixture containing a conductive material such as a first fibrous carbon material, a first polymer resin and a dispersion medium into a sheet and firing the sheet. For example, water, alcohol (ethanol, propanol, or the like) or the like is used as the dispersion medium. At this time, a surfactant may be added to the mixture. Examples of the surfactant include polyoxyethylene alkyl ether and alkylamine oxide. The surfactant may be appropriately selected depending on the type of the first conductive material and the dispersion medium. More specifically, the first conductive material, the first polymer resin, the surfactant, and the dispersion medium are kneaded, and the obtained mixture is molded into a sheet.

When the mixture is molded into a sheet, for example, it may be rolled by a roll press, a flat plate press, or the like, or may be introduced into an extruder to continuously form a sheet from a die head. The sheet may be further rolled. For rolling, a roll press machine can be used. The condition of the roll press is not particularly limited, but by rolling at a linear pressure of 0.001 ton/cm to 4 ton/cm, a gas diffusion layer with a high strength can be easily obtained.

The molded sheet may be fired. By firing, the surfactant and the dispersion medium are removed from the mixture. The mixture may be heated at the same time as rolling. The firing temperature and the firing time may be any temperature and time at which the surfactant and the dispersion medium evaporate or decompose. The firing temperature is preferably equal to or lower than the melting point of the first polymer resin (e.g., 330° C. to 350° C.). The evaporation or decomposition temperature of the surfactant is generally 260° C. or higher. Therefore, the firing temperature is preferably 260° C. or higher.

After firing, the sheet may be further rolled. This allows the thickness of the sheet to be adjusted. For the rolling after firing, a mold having a rib of a predetermined gas flow path pattern may be used. A gas flow path can be formed in the gas diffusion layer in this manner. The gas flow path may also be formed by cutting the main surface of the sheet after firing.

Hereinafter, the configuration of the catalyst layer will be described in detail.

(Catalyst Layer)

The catalyst layer includes a conductive material (hereinafter also referred to as second conductive material); catalyst particles and a polymer resin (hereinafter also referred to as second polymer resin). As the second conductive material, for example, a material having the same or similar physical properties as those of the first conductive material is exemplified. Among them, it is desirable that the second conductive material contains a second fibrous carbon material (that is, fibrous carbon material with average fiber diameter D2 of equal to or less than 25% of the thickness T of the catalyst layer) having the same or similar physical properties as those of the first fibrous carbon material. In this instance, it becomes easy to control the arithmetic mean roughness Ra1 of the first main surface of the catalyst layer to 0.6 μm or more.

The content of the second conductive material in the catalyst layer may be, for example, 1 mass % or more and 85 mass % or less, and more preferably 5 mass % or more and 75 mass % or less, based on the sum of the second conductive material, the catalyst particles, and the second polymer resin.

<Catalyst Particle>

The catalyst particles are not particularly limited, and include at least one, or an alloy of two or more selected from the group consisting of Sc, Y, Ti, Zr, V, Nb, Fe, Co, Ni, Ru, Rh, Pd, Pt, Os, Ir, lanthanide elements, and actinoid elements. For example, catalyst particles used for an anode include Pt—Ru alloys and the like. Catalytic metals used for a cathode include Pt, Pt—Co alloys, and the like.

<Second Polymer Resin>

The second polymer resin has a function as a binder fax binding the second conductive material together. In view of improving reactivity, preferably, the second resin material contains the proton conductive resin. As the proton-conductive resin, for example, those materials that can be used for the gas diffusion layer is exemplified. Preferably, 50 parts by mass or more and 200 parts by mass or less of the proton conductive resin is contained per 100 parts by mass of the second conductive material contained in the catalyst layer.

(Production Method of Catalyst Layer)

The catalyst layer can be formed, for example, by applying a catalyst ink containing a second conductive material, catalyst particles, a second polymer resin material, and the dispersion medium on a surface of a predetermined substrate and drying them. For example, an electrolyte membrane may be used as the substrate, and a substrate sheet for transfer may be used. When the electrolyte membrane is used as a substrate, a catalyst ink may be directly applied to the electrolyte membrane to form a catalyst layer. Alternatively, the catalyst ink may be applied to a transfer substrate sheet having a flat surface, and after drying, the catalyst layer may be transferred to the gas diffusion layer. Thus, the flatness of the second main surface of the catalyst layer contacting the electrolyte membrane is improved. As the application method, a screen printing method and a coating method using various coaters such as a blade coater, a knife coater, a gravure coater, and a die coater are preferable.

As the substrate sheet, a sheet with a smooth surface made of, for example, polyethylene terephthalate (PET), polypropylene or the like is preferably used.

(Production Method of Membrane Electrode Assembly)

As described above, when an electrolyte membrane is used as a substrate, a catalyst ink is directly applied to the electrolyte membrane, and a catalyst layer including a first main surface and a second main surface is formed so that the second main surface and the electrolyte membrane come into contact with each other. In this case, thereafter, by attaching a gas diffusion layer to the first main surface of the catalyst layer of the assembly of the electrolyte membrane and the catalyst layer, the membrane electrode assembly can be obtained. When a transfer substrate sheet is used, a catalyst layer including a first main surface and a second main surface is formed on the substrate sheet having a flat surface such that the second main surface contacts the flat surface. The gas diffusion layer is then stacked onto the catalyst layer so as to contact the first main surface of the catalyst layer. Thereafter, the substrate sheet is peeled from the second main surface of the catalyst layer and the electrolyte membrane is attached to the second main surface of the catalyst layer, whereby the membrane electrode assembly can be obtained. At this time, when the average fiber diameter D of the first fibrous carbon material is equal to or less than 25% of the thickness T of the catalyst layer, the unevenness in the first main surface of the gas diffusion layer becomes sufficiently small relative to the thickness of the catalyst layer, the deformation of the electrolyte membrane due to the unevenness of the gas diffusion layer can be reduced, and a gap that can be formed between the gas diffusion layer and the catalyst layer can be made small. Further, in the cross section in the thickness direction of the catalyst layer, the arithmetic mean roughness Ra1 of the first main surface and the arithmetic mean roughness Ra2 of the second main surface can easily satisfy the relationship Ra1>Ra2.

Hereinafter, the configuration of a fuel cell will be described in detail.

[Fuel Cell]

A fuel cell includes a first separator and a second separator disposed to sandwich the membrane electrode assembly with the first gas diffusion layer and the second gas diffusion layer interposed therebetween. Specifically, the fuel cell includes a membrane electrode assembly (hereinafter referred to as MEA) having an electrolyte membrane, a cathode in contact with one main surface of the electrolyte membrane, and an anode in contact with the other main surface of the electrolyte membrane, a conductive cathode separator (first separator) in contact with the cathode, and a conductive anode separator (second separator) in contact with the anode. The MEA and the pair of separators constitute one cell interposed therebetween. Usually, by stacking a plurality of cells so that the cathode separator and the anode separator are next to each other, a stack in which the cells are connected in series is formed.

Referring to FIG. 1, a cell 1 has a membrane electrode assembly (MEA) 5 including an anode 2, a cathode 3, and an electrolyte membrane 4 interposed between the anode 2 and the cathode 3. The MEA 5 is sandwiched between an anode separator 10 and a cathode separator 11. The anode 2 includes an anode catalyst layer (first catalyst layer) 6 in contact with the electrolyte membrane 4 and an anode gas diffusion layer (first gas diffusion layer) 7 in contact with the anode separator 10. The cathode 3 includes a cathode catalyst layer (second catalyst layer) 8 in contact with the electrolyte membrane 4 and a cathode gas diffusion layer (second gas diffusion layer) 9 in contact with the cathode separator 11. On one side of the MEA 5, a gasket 14 is disposed so as to seal the anode 2, and on the other side thereof, a gasket 15 is disposed so as to seal the cathode 3.

The anode separator 10 has a fuel flow path 12 that supplies a fuel to the anode 2. The cathode separator 11 has an oxidant channel 13 for supplying the oxidant to the cathode 3. A stack is formed by stacking a plurality of cells as shown in FIG. 1 in series electrically. In the stack, a sheet of a separator can be used, one side serving as an anode separator and the other side as a cathode separator. Further, a sheet of a separator can also be used, one side serving as an anode separator or as a cathode separator, and the other side as a coolant flow path. Outside the cell or stack, current collector plates 16 and 17 may be disposed, and end plates 18 and 19 may be placed and fastened to fix the fuel cell.

In the illustrated embodiment, the fuel flow path 12 is formed on the main surface of the anode separator 10, and the oxidant flow path 13 is formed on the main surface of the cathode separator 11; however, the fuel flow path may be formed on the main surface of the anode gas diffusion layer, and the oxidant flow a may be formed on the main surface of the cathode gas diffusion layer.

Hereinafter, the present invention will be described in detail based on examples. However, the present invention is not limited to the following examples.

Example 1

A membrane electrode assembly (MEA) as schematically shown in FIG. 2 was prepared. The MEA 5 includes an electrolyte membrane 4, an anode catalyst layer 6 and a cathode catalyst layer 8 disposed so as to sandwich the electrolyte membrane 4, and an anode gas diffusion layer 7 disposed outside the anode catalyst layer 6 and a cathode gas diffusion layer 9 disposed outside the cathode catalyst layer 8.

(1) Fabrication of Cathode Gas Diffusion Layer

A mixture was obtained by mixing 50 parts by mass of the first fibrous carbon material, 20 parts by mass of the particulate carbon material, and an appropriate amount of ethanol with a mixer, and then 30 parts by mass of PTFE was further added and mixed thereto. CNTs (average fiber diameter 0.15 μm, average length 6 μm) were used as the first fibrous carbon material. Acetylene black (average particle diameter: 40 nm) was used as the particulate carbon material. The obtained mixture was formed into a sheet using an extruder. Thereafter, rolling and firing were performed to obtain a fired sheet from which ethanol was removed. The fired sheet was further rolled to adjust the thickness to 200 μm. The obtained sheet was cut into a desired shape to obtain a cathode gas diffusion layer.

Separately, one sheet of water-repellent carbon paper (thickness 200 μm, average fiber diameter 10 μm) was prepared as an anode gas diffusion layer.

(2) Preparation of Cathode Catalyst Ink

A second conductive material carrying catalyst particles (Pt—Co alloy) was added to an appropriate amount of water, and stirred to be dispersed. For the second conductive material, 40 parts by mass of CNTs (average fiber diameter 0.15 μm, average length: 6 μm) as the second fibrous carbon material and 100 parts by mass of carbon black (average particle diameter: 40 nm) as a particulate carbon material were used. After adding an appropriate amount of ethanol while stirring the obtained dispersion, 80 parts by mass of a proton conductive resin (Nafion®) was added to 100 parts by mass of the second particulate carbon material carrying 30 parts by mass of the catalyst particles to prepare a cathode catalyst ink.

(3) Preparation of Anode Catalyst Ink

A second conductive material carrying catalyst particles (Pt—Ru alloy) was added to an appropriate amount of water, and stirred to be dispersed. For the second conductive material, carbon black (average particle diameter: 40 nm), which is a particulate carbon material, was used. After adding an appropriate amount of ethanol while stirring the obtained dispersion, 80 parts by mass of a proton conductive resin (Nafion®) was added to 100 parts by mass of the particulate carbon material carrying 30 parts by mass of catalyst particles to prepare an anode catalyst ink.

(4) Stacking Layers

The cathode catalyst ink was applied to the surface of a substrate sheet made of PET having a flat surface and dried to form a cathode catalyst layer (thickness 6 μm). Thereafter, the cathode catalyst layer was transferred to one side of the cathode gas diffusion layer to form a cathode. The average fiber diameter D (0.15 μm) of the first fibrous carbon material of the cathode gas diffusion layer was 2.5% of the thickness T (6 μm) of the cathode catalyst layer.

The anode catalyst ink was applied to the surface of a substrate sheet made of PET having a flat surface and dried to form an anode catalyst layer (thickness 3 μm). Thereafter, the anode catalyst layer was transferred to one side of the anode gas diffusion layer to form an anode.

Next, the electrolyte membrane was sandwiched between the anode and the cathode so that the anode catalyst layer and the cathode catalyst layer contacted the electrolyte membrane, respectively, and rolled to obtain a membrane electrode assembly (MEA) A1. As the electrolyte membrane, a Nafion film (registered trademark) having a thickness of 15 μm and a size larger than that of the cathode was used.

[Evaluation 1]

A cross section of the membrane electrode assembly (MEA) A1 was taken by scanning electron microscopy (SEM). FIG. 3 illustrates the cathode side region of the SEM image. FIG. 4 is an enlarged view of a portion of FIG. 3. It can be seen from the figures that the unevenness in first main surface of the cathode gas diffusion layer is sufficiently small relative to thickness of catalyst layer.

A gap is necessarily formed between the cathode gas diffusion layer and the catalyst layer. The size Wk of the largest gap s observed by SEM in a direction along the interface between the cathode catalyst layer and the cathode gas diffusion layer was 1.5 μm or less, which was sufficiently smaller than the thickness T of the cathode catalyst layer. The size Ws of the gap in the thickness of the cathode catalyst layer was 0.6 μm, which was sufficiently smaller than Wk.

The arithmetic mean roughness Ra1 of the first main surface and the arithmetic mean roughness Ra2 of the second main surface of the cathode catalyst layer were obtained by image-processing FIG. 4: Ra1 was 1.5 μm and Ra2 was 0.2 μm, and the relation Ra1>Ra2 was satisfied.

Comparative Example 1

(1) Preparation of Gas Diffusion Layer

Two sheets of water-repellent carbon paper (thickness 200 μm, average fiber diameter 10 μm) were prepared as an anode gas diffusion layer and a cathode gas diffusion layer.

(2) Preparation of Cathode Catalyst Ink

A cathode catalyst ink was prepared in the same manner as in Example 1.

(3) Preparation of Anode Catalyst Ink

An anode catalyst ink was prepared in the same manner as in Example 1.

(4) Stacking Layers

The cathode catalyst ink was applied to the surface of a substrate sheet made of PET having a flat surface and dried to form a cathode catalyst layer (thickness 6 μm).

The anode catalyst ink was applied to the surface of a substrate sheet made of PET having a flat surface and dried to form an anode catalyst layer (thickness 3 μm).

The same electrolyte membrane as in Example 1 was prepared, and the cathode catalyst layer and the anode catalyst layer were transferred to the surfaces of the electrolyte.

Next, the assembly of the catalyst layer and the electrolyte membrane was sandwiched between the cathode gas diffusion layer and the anode gas diffusion layer so that the cathode catalyst layer and the cathode gas diffusion layer were in contact with each other and the anode catalyst layer and the anode gas diffusion layer were in contact with each other, thereby forming a membrane electrode assembly (MEA) B1. The average fiber diameter 10 μm of the carbon paper of the respective gas diffusion layers was 167% of the thickness 6 μm of the cathode catalyst layer.

[Evaluation 2]

A cross section of the membrane electrode assembly (MEA) B1 was taken by scanning electron microscopy (SEM). FIG. 5 illustrates the cathode side region of the SEM image. It can be seen from FIG. 5 that the unevenness in the first main surface of the cathode gas diffusion layer is considerably larger than the thickness of the catalyst layer. In FIG. 5, a large cross section of the carbon paper F is observed, and it can be understood that the unevenness of the first main surface of the catalyst layer is greatly affected.

The size Wk of the largest gap S observed by SEM in a direction along the interface between the cathode catalyst layer and the cathode gas diffusion layer was greater than 10 μm, which was considerably larger than the thickness T of the cathode catalyst layer.

The arithmetic mean roughness Ra1 of the first main surface and the arithmetic mean roughness Ra2 of the second main surface of the cathode catalyst layer were obtained by image-processing FIG. 5: Ra1 was 4.5 μm, and Ra2 was 4.6 μm.

INDUSTRIAL APPLICABILITY

The fuel cell of the present invention can be suitably used particularly as a power source for vehicles, a power source for stationary household cogeneration systems, and the like. The present invention is suitable for use in a polymer electrolyte fuel cell, but the application is not limited thereto and is applicable to fuel cells in general.

Although the present invention has been described in terms of the presently preferred embodiments, it is to be understood that such disclosure is not to be interpreted as limiting. Various alterations and modifications no doubt become apparent to those skilled in the art to which the present disclosure pertains, after having read the above disclosure. Accordingly, it is intended that the appended claims be interpreted as covering all alterations and modifications as fall within the true spirit and scope of the invention.

REFERENCE SIGNS LIST

1 Cell
2 Anode
3 Cathode
4 Electrolyte Membrane
5 Membrane electrode assembly (MEA)
6 Anode catalyst layer
10 Anode separator
7 Anode gas diffusion layer
8 Cathode catalyst layer
11 Cathode separator
9 Cathode gas diffusion layer
14, 15 Gasket
12 Fuel flow path
13 Oxidant flow path
16,17 Current collecting plate
18,19 End plate

The invention claimed is:

1. A membrane electrode assembly for a fuel cell comprising:
   a catalyst layer having a first main surface and a second main surface,
   a gas diffusion layer disposed on a side of the first main surface, and
   an electrolyte membrane disposed on a side of the second main surface, wherein
   the gas diffusion layer includes a conductive material and a polymer resin,
   the conductive material comprises a fibrous carbon material,
   an average fiber diameter D of the fibrous carbon material is equal to or less than 25% of a thickness T of the catalyst layer, and
   in a cross section in a thickness direction of the catalyst layer, an arithmetic mean roughness Ra1 of the first main surface and an arithmetic mean roughness Ra2 of the second main surface satisfies the relation, Ra1>Ra2.

2. The membrane electrode assembly for a fuel cell of claim 1, wherein the average fiber diameter D is 5 nm or more and 250 nm or less.

3. The membrane electrode assembly for a fuel cell of claim 1, wherein a ratio of the arithmetic mean roughness Ra1 of the first main surface to the arithmetic mean roughness Ra2 of the second main surface: Ra1/Ra2 satisfies 2≤Ra1/Ra2.

4. The membrane electrode assembly for a fuel cell of claim 1, wherein the thickness T of the catalyst layer is 1 µm or more and 20 µm or less.

5. The membrane electrode assembly for a fuel cell of claim 1, wherein the arithmetic mean roughness Ra1 of the first main surface is equal to or less than 30% of the thickness T of the catalyst layer.

6. The membrane electrode assembly for a fuel cell of claim 5, wherein the arithmetic mean roughness Ra1 of the first main surface is equal to or more than 10% of the thickness T of the catalyst layer.

7. The membrane electrode assembly for a fuel cell of claim 6, wherein the arithmetic mean roughness Ra2 of the second main surface is equal to or less than 5% of the thickness T of the catalyst layer.

8. The membrane electrode assembly for a fuel cell of claim 1, wherein the thickness T of the catalyst layer is 5 µm or more and 10 µm or less.

9. The membrane electrode assembly for a fuel cell of claim 8, wherein the arithmetic mean roughness Ra1 of the first main surface is 2 µm or less.

10. The membrane electrode assembly for a fuel cell of claim 9, wherein the arithmetic mean roughness Ra1 of the first main surface is 0.6 µm or more.

11. The membrane electrode assembly for a fuel cell of claim 10, wherein the arithmetic mean roughness Ra2 of the second main surface is 0.3 µm or less.

12. The membrane electrode assembly for a fuel cell of claim 1, wherein a gap is provided in an interface region between the catalyst layer and the gas diffusion layer,
   a size Wk of the gap in a direction along the interface is equal to or less than the thickness T of the catalyst layer, and
   a size Ws of the gap in the thickness direction of the catalyst layer is equal to or less than the size Wk.

13. A membrane electrode assembly for a fuel cell comprising an electrolyte membrane,
   a pair of catalyst layers disposed to sandwich the electrolyte membrane, and
   a pair of gas diffusion layers disposed to sandwich the electrolyte membrane with the pair of catalyst layers interposed therebetween,
   wherein the pair of catalyst layers each has a first main surface and a second main surface,
   each of the gas diffusion layers is disposed on a side of the first main surface of the corresponding catalyst layer of the pair of catalyst layers,
   the electrolyte membrane is disposed on a side of the second main surface,
   at least one of the pair of gas diffusion layers includes a conductive material and a polymer resin,
   the conductive material comprises a fibrous carbon material,
   the average fiber diameter D of the fibrous carbon material is equal to or less than 25% of the thickness T of the catalyst layer, and
   in a cross section in a thickness direction of the catalyst layer, an arithmetic mean roughness Ra1 of the first main surface and an arithmetic mean roughness Ra2 of the second main surface satisfies the relation, Ra1>Ra2.

14. A fuel cell comprising the membrane electrode assembly for a fuel cell of claim 13, and a pair of separators disposed to sandwich the membrane electrode assembly for a fuel cell with the pair of gas diffusion layers provided by the membrane electrode assembly for a fuel cell.

* * * * *